United States Patent
Fukushima (10) Patent No.: US 10,615,616 B2
(45) Date of Patent: Apr. 7, 2020

(54) ENERGY STORAGE APPARATUS FOR VEHICLE AND VEHICLE

(71) Applicant: GS Yuasa International Ltd., Kyoto (JP)

(72) Inventor: Atsushi Fukushima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 153 days.

(21) Appl. No.: 15/723,983

(22) Filed: Oct. 3, 2017

(65) Prior Publication Data
US 2018/0097380 A1    Apr. 5, 2018

(30) Foreign Application Priority Data
Oct. 3, 2016  (JP) .................................. 2016-195534

(51) Int. Cl.
*H02J 7/00* (2006.01)
*B60R 16/033* (2006.01)

(52) U.S. Cl.
CPC .......... *H02J 7/0031* (2013.01); *B60R 16/033* (2013.01); *H02J 7/00306* (2020.01)

(58) Field of Classification Search
None
See application file for complete search history.

(56) References Cited

U.S. PATENT DOCUMENTS

| | | | | |
|---|---|---|---|---|
| 3,763,415 A | * | 10/1973 | Ownby | H02J 7/1423 307/10.1 |
| 4,902,956 A | * | 2/1990 | Sloan | H02J 1/14 307/10.7 |
| 5,781,013 A | * | 7/1998 | Takahashi | B60R 16/04 324/426 |
| 6,034,510 A | | 3/2000 | Kikuchi et al. | |
| 2006/0058897 A1 | * | 3/2006 | Senda | B60R 16/03 700/22 |
| 2012/0176231 A1 | * | 7/2012 | Skaff | B60K 35/00 340/439 |

FOREIGN PATENT DOCUMENTS

| | | |
|---|---|---|
| JP | 11-122840 A | 4/1999 |
| JP | 11-334498 A | 12/1999 |
| JP | 2002/051405 A | 2/2002 |
| JP | 2008/094178 A | 4/2008 |
| JP | 2012/207626 A | 10/2012 |
| JP | 2015/120465 A | 7/2015 |
| JP | 2015/180140 A | 10/2015 |

* cited by examiner

*Primary Examiner* — Jared Fureman
*Assistant Examiner* — Joel Barnett
(74) *Attorney, Agent, or Firm* — Alston & Bird LLP (57) ABSTRACT

An energy storage apparatus for a vehicle, the energy storage apparatus including: an energy storage device; and a cut-off device which cuts off a current to/from the energy storage device when a voltage or a capacity of the energy storage device is lower than a threshold. The threshold for the cut-off device is different between a state in which the vehicle is traveling and a state in which the vehicle is being parked.

12 Claims, 11 Drawing Sheets

| ITEM | NECESSARY INFORMATION | NUMERICAL EXAMPLE |
|---|---|---|
| 1 | ACTUAL CAPACITY OF BATTERY | 60 Ah |
| 2 | SOC WHEN PARKING IS STARTED | 70% |
| 3 | CONSUMPTION CURRENT OF MANAGEMENT DEVICE | 0.25 mA |
| 4 | VEHICLE DARK CURRENT | 30 mA |
| 5 | MINIMUM DRIVE VOLTAGE OF RELAY | 5.0 V |
| 6 | SELF-DISCHARGE AMOUNT OF BATTERY | 0.3 mA |
| 7 | CAPACITY FROM 0% IN SOC TO USABLE VOLTAGE LIMIT (5 V) | 0.5 Ah |

| SOC AT WHICH RELAY IS MADE TO OPERATE (%) | CAPACITY C1 (Ah) | CAPACITY C2 (Ah) | DISCHARGEABLE CAPACITY C3 (Ah) | FIRST PERIOD T1 (DAY) | SECOND PERIOD T2 (DAY) | TOTAL PERIOD T (DAY) |
|---|---|---|---|---|---|---|
| 0 | 42 | 0 | 0.5 | 57.3 | 37.9 | 95.2 |
| 0.5 | 42 | 0.3 | 0.8 | 56.9 | 60.6 | 117.5 |
| 1 | 42 | 0.6 | 1.1 | 56.5 | 83.3 | 139.8 |
| 1.5 | 42 | 0.9 | 1.4 | 56.1 | 106.1 | 162.1 |
| 2 | 42 | 1.2 | 1.7 | 55.6 | 128.8 | 184.4 |
| 3 | 42 | 1.8 | 2.3 | 54.8 | 174.2 | 229.1 |

NOTE THAT THE DISCHARGE CURRENT Is1 IS 30.55 mA AND DISCHARGE CURRENT Is2 IS 0.55 mA.

| SOC [%] WHEN PARKING IS STARTED | THRESHOLD Xb [V] |
|---|---|
| SOC1 | Xb1 |
| SOC2 | Xb2 |
| SOC3 | Xb3 |
| SOC4 | Xb4 |
| SOC5 | Xb5 |
| SOC6 | Xb6 |
| SOC7 | Xb7 |

FIG. 11

ENERGY STORAGE APPARATUS FOR VEHICLE AND VEHICLE

CROSS REFERENCE TO RELATED APPLICATIONS

This application claims priority to and the benefit of Japanese Patent Application No. 2016-195534, filed on Oct. 3, 2016, the entire contents of which as are hereby incorporated by reference.

BACKGROUND

Related Field

The present invention relates to an energy storage apparatus for a vehicle.

Description of Related Art

Conventionally, an energy storage apparatus used as a power supply for an automobile incorporates a cut-off device such as a relay or an FET to secure safety. For example, when a voltage of the energy storage apparatus becomes lower than a threshold, the cut-off device is made to operate to cut off a current so that the voltage will not become lower than the threshold. JP 11-334498 A describes that a threshold (threshold voltage) of a relay RLY4 provided on a current path of a battery is set to different values between while a vehicle is being transported abroad and while the vehicle is being parked.

BRIEF SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Different performances may be required to an energy storage apparatus between while a vehicle is traveling and while a vehicle is being parked. If the same threshold is used to make a cut-off device operate while the vehicle is traveling and while the vehicle is being parked, the required performance may not be sufficiently satisfied.

An object of the present invention is to achieve, by switching thresholds, a performance appropriate for each of a state in which a vehicle is traveling and a state in which a vehicle is being parked.

An energy storage apparatus for a vehicle according to an aspect of the present invention includes: an energy storage device; and a cut-off device which cuts off a current to/from the energy storage device when a voltage or a capacity of the energy storage device is lower than a threshold, wherein the threshold for the cut-off device is different between a state in which the vehicle is traveling and a state in which the vehicle is being parked

BRIEF DESCRIPTION OF THE FIGURES

The foregoing and other features of the present invention will become apparent from the following description and drawings of an illustrative embodiment of the invention in which.

DETAILED DESCRIPTION OF VARIOUS EMBODIMENTS

First, a general description will be given on aspects of the present embodiment. An energy storage apparatus for a vehicle includes: an energy storage device; and a cut-off device which cuts off a current to/from the energy storage device when a voltage or a capacity of the energy storage device is lower than a threshold, wherein the threshold for the cut-off device is different between a state in which the vehicle is traveling and a state in which the vehicle is being parked. With this configuration, the energy storage apparatus can achieve a performance appropriate for each of the state in which the vehicle is traveling and the state in which the vehicle is being parked.

The threshold for the cut-off device may be lower while the vehicle is traveling than while the vehicle is being parked. With this configuration, supply of power to the vehicle while the vehicle is traveling can be maintained until the energy storage device reaches a lower voltage than while the vehicle is being parked. Further, the cut-off device is made to operate at a higher voltage while the vehicle is being parked than while the vehicle is traveling; therefore, a dark current to the vehicle is cut so that the lowering of the capacity can be prevented or reduced.

The cut-off device may be driven by a power supplied from the energy storage device, and the threshold for the cut-off device while the vehicle is traveling preferably is a minimum drive voltage of the cut-off device. With this configuration, it is possible to prevent the cut-off device from becoming inoperable while the vehicle is traveling, and the safety of the energy storage apparatus can thus be secured. Further, the supply of power is maintained down to almost the end of the operable range of the cut-off device while the vehicle is traveling.

The cut-off device may be driven by a power supplied from the energy storage device, and the threshold for the cut-off device while the vehicle is being parked is preferably a voltage higher than a minimum drive voltage of the cut-off device. With this configuration, while the vehicle is being parked, the cut-off device is made to operate by a voltage higher than the minimum drive voltage of cut-off device to cut the dark current to the vehicle so that the lowering of the capacity can be prevented or reduced. Further, even after the cut-off device operates, driving again the cut-off device makes the energy storage apparatus usable again until the voltage of the energy storage apparatus becomes lower than the minimum drive voltage of the cut-off device.

The threshold for the cut-off device while the vehicle is being parked may be set such that a total period which is a total of a first period and a second period is equal to or longer than a predetermined period, where the first period is a period from when parking is started until the cut-off device operates, and the second period is a period which is after the cut-off device operates and in which the energy storage device becomes usable when the cut-off device is driven again. With this configuration, the total period (the total of the first period and the second period) is secured to be equal to or longer than the predetermined period.

The threshold for the cut-off device while the vehicle is being parked may be set such that the total period is equal to or longer than the predetermined period and such that the first period is longest. With this configuration, the total period is secured to be equal to or longer than the predetermined period. Also, a period in which the energy storage apparatus can be used without driving the cut-off device again can be prolonged.

An Embodiment

An embodiment of the present invention will be described with reference to FIG. 1 to FIG. 11.

1. The Description of a Battery

Figure 1:
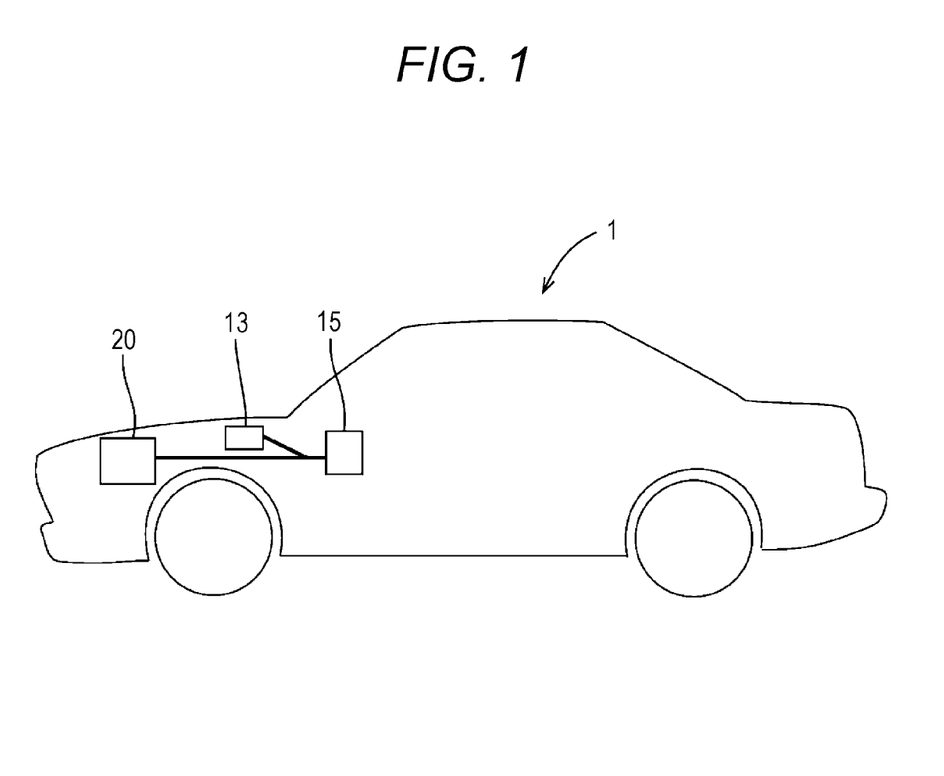
FIG. 1 is a side view of a vehicle applied to a first embodiment.
Figure 2:
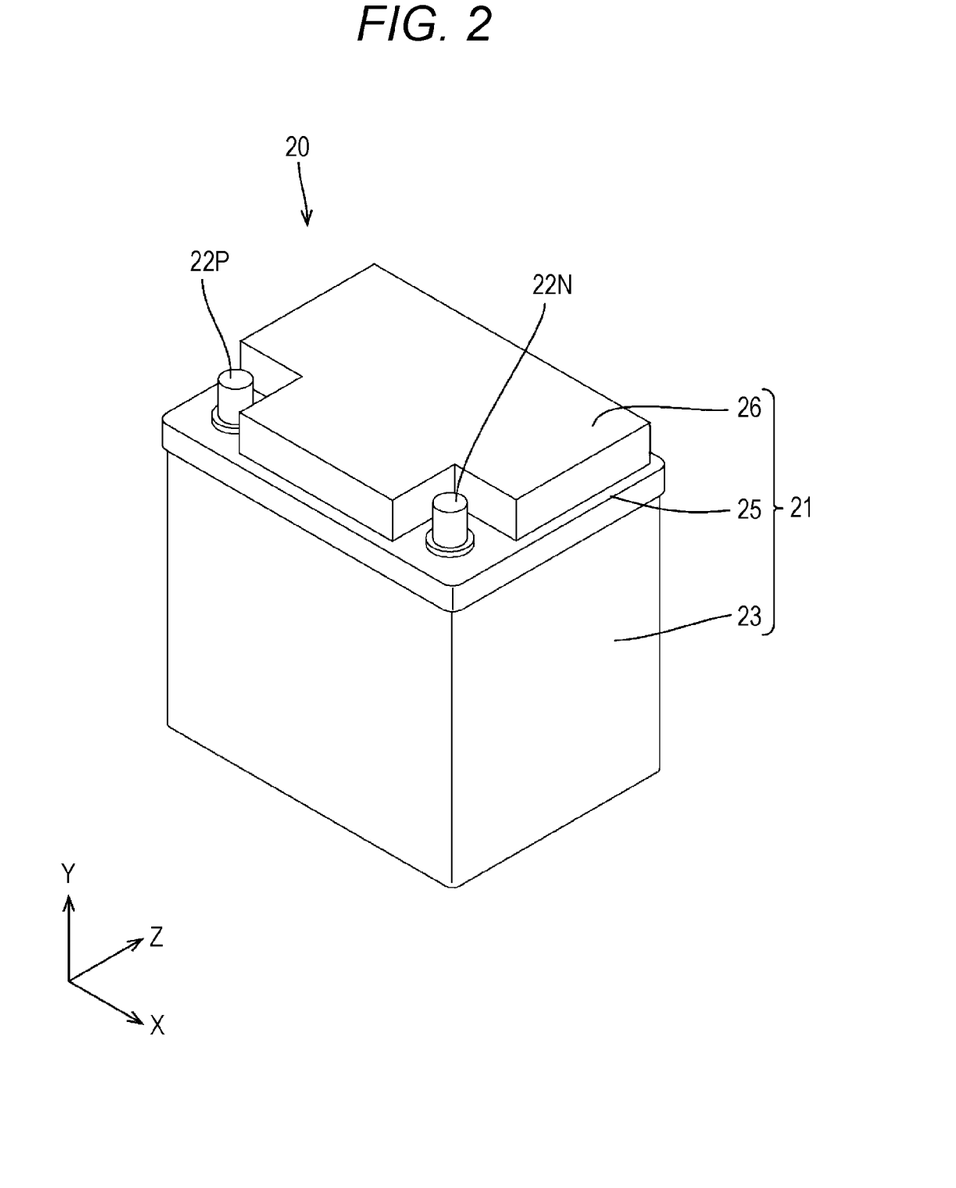
FIG. 2 is a perspective view of a battery.
Figure 3:
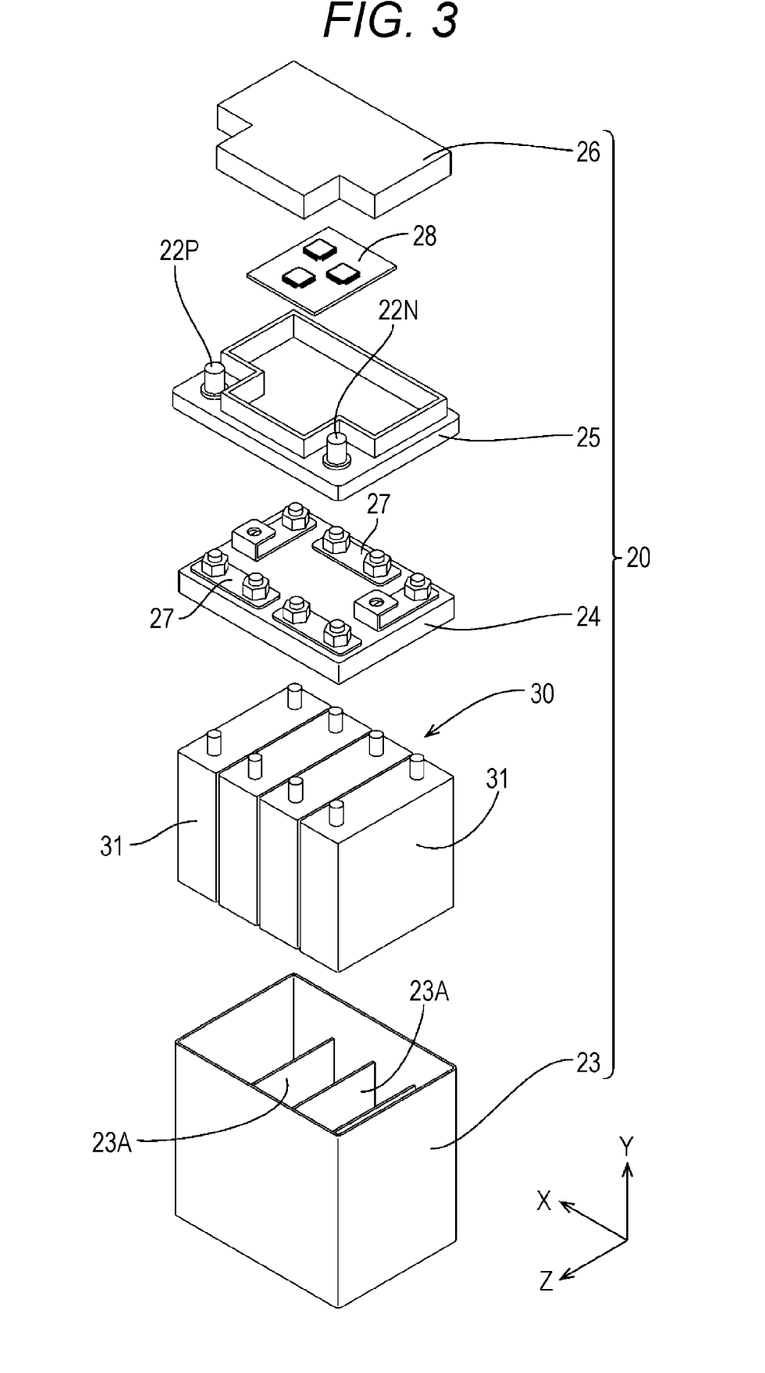
FIG. 3 is an exploded perspective view of the battery.

FIG. 1 is a side view of a vehicle, FIG. 2 is a perspective view of a battery, and FIG. 3 is an exploded perspective view of the battery.

A vehicle 1 is equipped with an engine starter device 15, an alternator 13, and a battery 20 as shown in FIG. 1. Note that although not shown in FIG. 1, on the vehicle 1 is installed electric equipment 17 such as a vehicle ECU 16, lights, an audio set, and an air conditioner.

The battery (an example of an "energy storage apparatus" of the present invention) 20 has a block-shaped battery case 21 as shown in FIG. 2, and in the battery case 21 are housed an assembled battery 30 made up of a plurality of secondary battery cells 31 and a circuit board 28. Note that when FIG. 2 and FIG. 3 are referred to in the following description, the Y direction is the vertical direction of the battery case 21 horizontally positioned with respect to an installation surface without inclination, the X direction is the direction along the long side direction of the battery case 21, and the Z direction is the depth direction of the battery case 21.

As shown in FIG. 3, the battery case 21 is equipped with a box-shaped case body 23 opened upward, a positioning member 24 which positions the secondary batteries 31, an inner lid 25 mounted at an upper part of the case body 23, and an upper lid 26 mounted above the inner lid 25. In the case body 23 are provided a plurality of cell chambers 23A arranged in the X direction, and in each of the cell chambers 23A is individually housed each of the secondary battery cells 31.

The positioning member 24 has a plurality of bus bars 27 disposed on the upper surface as shown in FIG. 3, the positioning member 24 is disposed above the secondary battery cells 31 arranged in the case body 23, whereby the secondary battery cells 31 are positioned in place and connected in series with the bus bars 27.

The inner lid 25 has an approximately rectangular shape in a plan view as shown in FIG. 2 and is shaped to have different elevations in the Y direction. On the both end parts in the X direction of the inner lid 25 is provided a pair of terminals 22P and 22N to which harness terminals (not shown) are connected. The pair of terminals 22P and 22N is made of metal such as lead alloy. The terminal 22P is a positive electrode terminal, and the terminal 22N is a negative electrode terminal.

Further, the inner lid 25 can contain therein the circuit board 28 as shown in FIG. 3, and the inner lid 25 is attached on the case body 23, whereby the secondary battery cells 31 and the circuit board 28 are connected to each other.

2. An Electrical Configuration of the Battery 20

Figure 4:
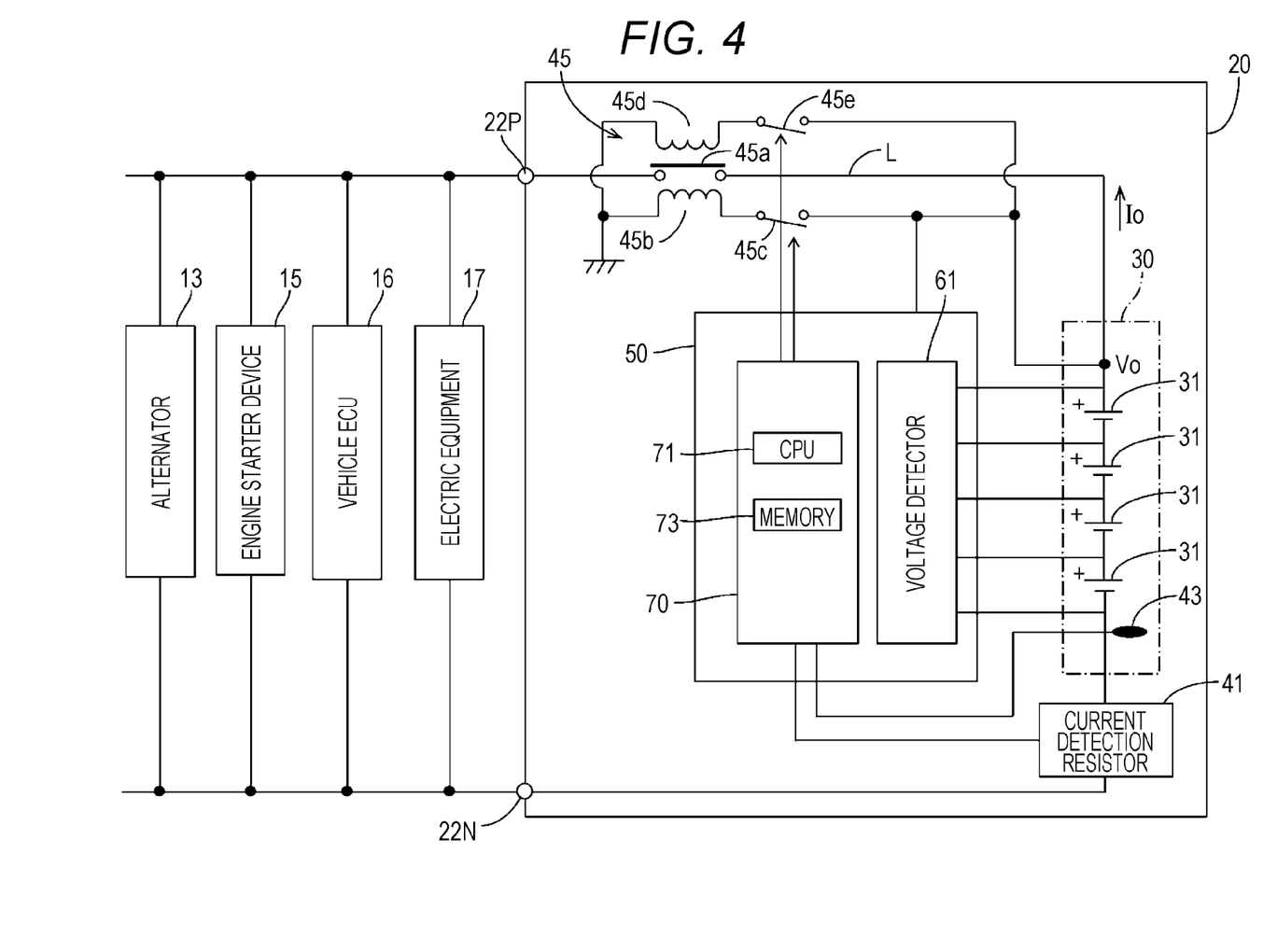
FIG. 4 is a block diagram showing an electric configuration of the battery.

FIG. 4 is a circuit diagram showing an electrical configuration of the battery 20. The alternator 13, the engine starter device 15, the vehicle ECU 16, the electric equipment 17 are connected to the battery 20 through the positive electrode terminal 22P and the negative electrode terminal 22N which are external terminals.

The battery 20 has the assembled battery 30, a current detection resistor 41, a temperature sensor 43, a relay 45, and a management device 50 which manages the assembled battery 30. The assembled battery 30, the current detection resistor 41, and the relay 45 are connected in series through a current path L. In the present example, the current detection resistor 41 is disposed on the negative electrode side, and the relay 45 is disposed on the positive electrode side.

The assembled battery 30 is configured with a plurality of series connected (four cells in the present example) of lithium ion secondary batteries (an example of the "energy storage device" of the present invention) 31. Note that the "cell" represents a configuration unit of the assembled battery 30, and one cell represents one lithium ion secondary battery 31.

The current detection resistor 41 has a function of detecting a current flowing through the secondary battery cells 31. The temperature sensor 43 is of a contact type or a non-contact type and has a function of measuring a temperature [° C.] of the secondary battery cells 31. The current detection resistor 41 and the temperature sensor 43 are electrically connected to the management device 50 through signal lines, and detection values from the current detection resistor 41 and the temperature sensor 43 are taken into the management device 50.

The relay (an example of the "cut-off device" of the present invention) 45 is a protective device which cuts off a current in an abnormal situation to secure safety of the battery 20. The relay 45 is a latch relay and includes a contact point 45$a$, a drive coil for setting 45$b$, a switch 45$c$, a drive coil for resetting 45$d$, a switch 45$e$. When the switch 45$c$ is closed to flow a current through the drive coil for setting 45$b$, the contact point 45$a$ is kept in a closed state, whereby a current flows through the battery 20. Alternatively, when the switch 45$e$ is closed to cause a current to flow through the drive coil for resetting 45$d$, the contact point 45$a$ is kept in an open state, whereby the current flowing through the battery 20 is cut off.

The management device 50 is equipped with a voltage detector 61 and a controller 70. The voltage detector 61 is connected to the both ends of each of the secondary battery cells 31 through detection lines and has a function of measuring voltages (cell voltages) of the secondary battery cells 31 and a battery voltage (a total voltage of the assembled battery 30) Vo.

The controller 70 includes a CPU 71, which is a central processing unit, and a memory 73. The CPU 71 monitors a current Io flowing through the battery 20, the voltage Vo, and the temperature on the basis of the outputs from the current detection resistor 41, the voltage detector 61, and the temperature sensor 43, and calculates an SOC (State Of Charge) of the battery 20 on the basis of an integrated value of the current Io. The SOC may be the ratio of the residual capacity to the actual capacity.

Further, the controller 70 has a function of controlling the relay 45 by controlling opening and closing of the switch 45c. The memory 73 stores information for monitoring the battery 20. Also, the memory 73 stores data of thresholds Xa and Xb based on which the relay 45 is made to operate.

The management device 50, the relay 45, and the current detection resistor 41 are mounted on the circuit board 28 and are therefore provided in the battery 20. Further, the temperature sensor 43 is also provided in the battery 20.

3. The Battery Performance While the Vehicle is Traveling and While the Vehicle is Being Parked While the vehicle is traveling, it is preferable that supply of power to the vehicle be maintained without opening the relay 45 until the battery voltage reaches a usable voltage limit of the battery 20 so that safety of the vehicle can be secured. On the other hand, while the vehicle is being parked, the residual capacity of the battery 20 is decreased due to a vehicle dark current. To address this issue, it is preferable that the relay 45 be opened, depending on the degree of decrease in the residual capacity, to cut the dark current to the vehicle so that the battery voltage does not become lower than the usable voltage limit for a predetermined period.

As described above, the battery 20 is required to have different performances between the state in which the vehicle is traveling and the state in which the vehicle is being parked. Therefore, in the battery 20 of the present embodiment, different values are used as the threshold X, based on which the relay 45 is made to operate, in the state in which the vehicle is traveling and in the state in which the vehicle is being parked. The threshold Xb while the vehicle is being parked is set higher than the threshold Xa while the vehicle is traveling. Note that the expression "the relay 45 is made to operate" means that the contact point 45a of the relay 45 is switched from a closed state to an open state.

(1) The Threshold Xa While the Vehicle is Traveling

The relay 45 is configured to operate by the battery 20 as a power supply as shown in FIG. 4, and when the battery voltage Vo becomes lower than the minimum drive voltage (e.g., 5 V) of the relay 45, the relay 45 becomes inoperable. Note that the battery voltage Vo is a total voltage of the assembled battery 30.

If the relay 45, which is a safety device, becomes inoperable, the battery 20 cannot be safely used. Considering that the usable voltage limit with which the battery 20 can be safely used should be equal to the minimum drive voltage of the relay 45, the threshold Xa while the vehicle is traveling is set to the minimum drive voltage (5 V) of the relay 45.

While the vehicle is traveling, the controller 70 compares the battery voltage Vo with the threshold Xa, and if the battery voltage Vo becomes lower than the threshold Xa, the controller 70 makes the relay 45 operate to cut off the current Io. By this operation, while the vehicle is traveling, the relay 45 does not operate until the battery voltage Vo drops to the usable voltage limit so that the supply of power to the vehicle can be maintained. That is, while the vehicle is traveling, the supply of power to the vehicle can be maintained down to almost the end of the operable range of the relay 45.

(2) The Threshold Xb While the Vehicle is Being Parked

Figure 5:
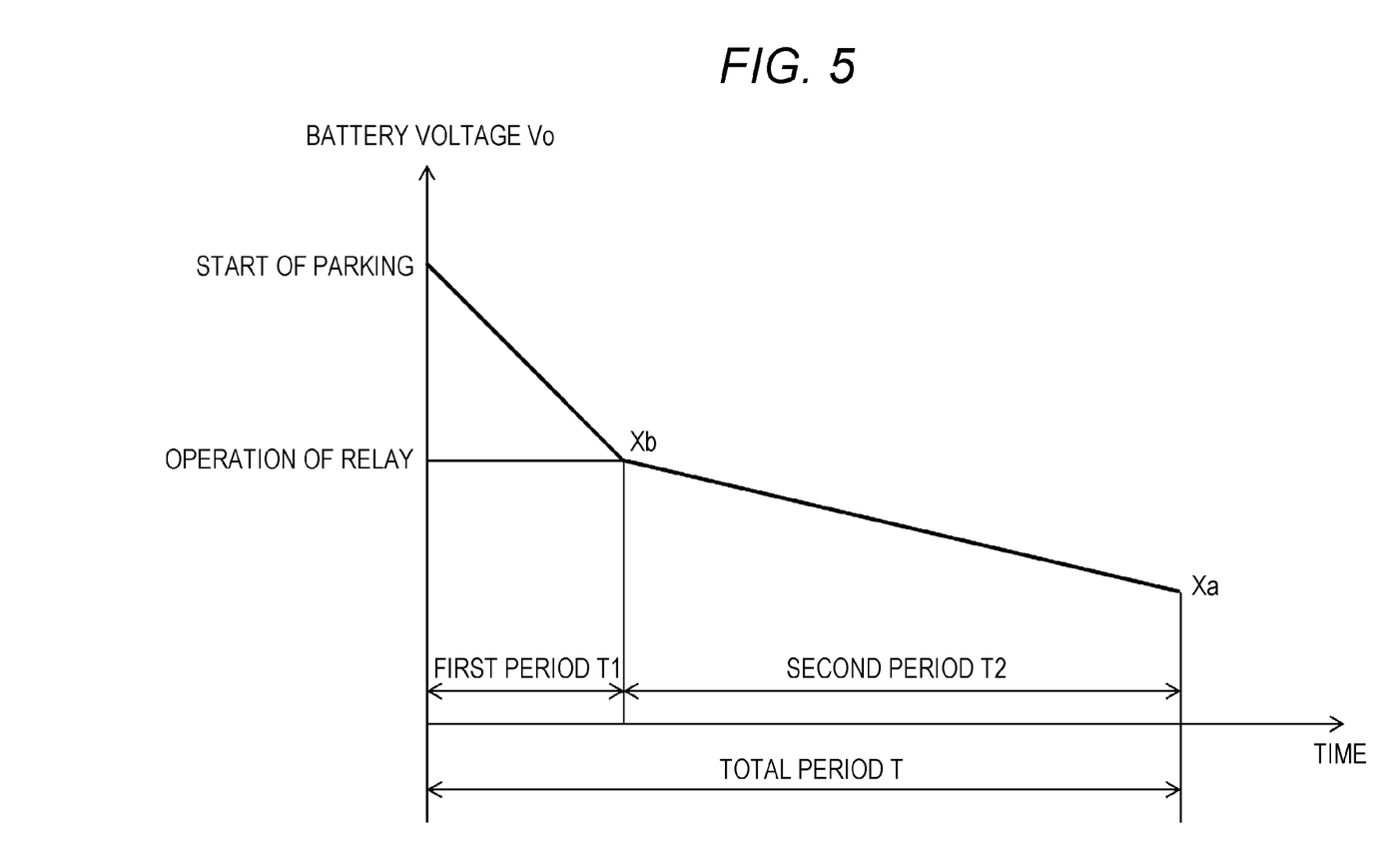
FIG. 5 is a graph showing a change in a voltage of the battery after the vehicle is parked.

FIG. 5 shows the battery voltage Vo after start of parking. The battery 20 is discharged after start of parking due to the dark current to the vehicle 1 and the consumption current of the management device 50; thus, the battery voltage Vo drops with time.

As shown in FIG. 5, the inclination of the battery voltage Vo is smaller after the relay 45 operates than before the relay 45 operates. This is because, after the operation of the relay, the discharge is decreased with the dark current to the vehicle being cut.

Hereinafter, the period after start of parking and until the relay 45 is made operate is referred to as a first period T1. The period after the relay 45 is made to operate and until the battery voltage Vo reaches the usable voltage limit (specifically, 5 V which is the minimum drive voltage of the relay) is referred to as a second period T2.

The first period T1 can be calculated from a residual capacity C1 of the battery 20 at a time of start of parking, a residual capacity C2 of the battery 20 when the relay operates, and a discharge current Is1 of the battery 20.

$$T1=(C1-C2)/Is1 \qquad \text{Equation 1}$$

Figure 6:
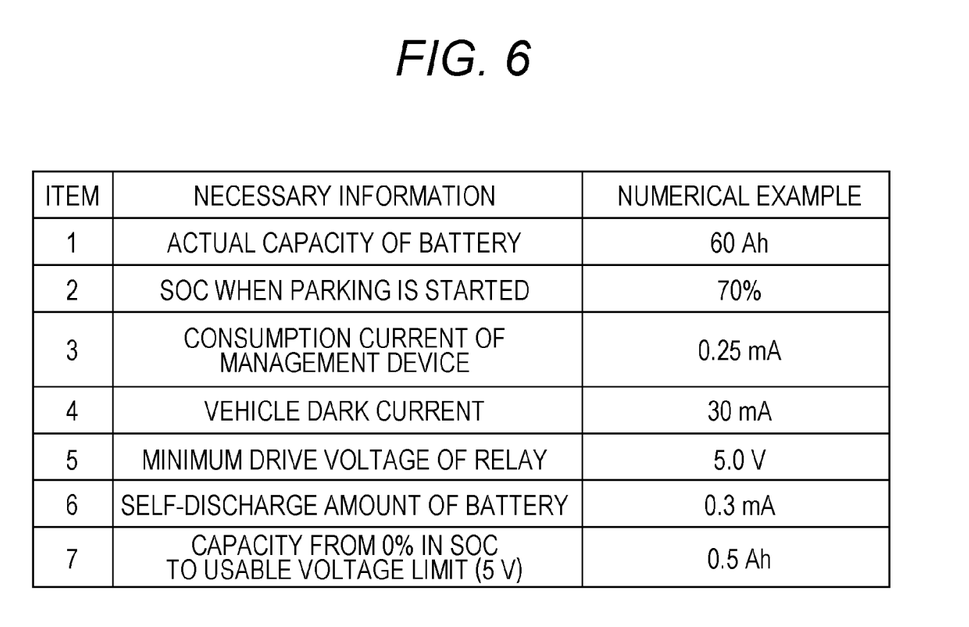
FIG. 6 is numerical examples of information necessary to calculate a first period and a second period.

FIG. 6 shows numerical examples used to calculate the first period T1 and the second period T2. The residual capacity C1 of the battery 20 at the time of start of parking can be calculated by multiplying an actual capacity Co of the battery 20 by the SOC at the time of start of parking. In the examples of FIG. 6, the actual capacity Co of the battery 20 is 60 Ah, the SOC at the time of start of parking is 70%, and the residual capacity C1 of the battery 20 at the time of start of parking is 42 Ah. Note that the actual capacity Co is a capacity which can be taken out from the state in which the battery 20 is completely charged to the state in which the SOC is 0%.

The discharge current Is1 is a discharge current which the battery 20 discharges when the relay 45 is closed while the vehicle is being parked. The discharge current Is1 can be obtained as a sum of the dark current (the current consumed by the vehicle ECU 16 and some specific equipment such as the electric equipment 17 while the vehicle is being parked) to the vehicle, the consumption current of the management device 50, and a self-discharge amount of the battery 20. As the dark current to the vehicle, the consumption current of the management device 50, and the self-discharge amount of the battery 20, experience values based on the past results can be used. In the examples of FIG. 6, the dark current to the vehicle is 30 mA, the consumption current of the management device 50 is 0.25 mA, and the self-discharge amount of the battery 20 is 0.3 mA. Therefore, the discharge current Is1 is 30.55 mA.

For example, if the relay 45 is cut when the SOC is 0%, the residual capacity C2 of the battery 20 is 0 Ah when the relay operates. Therefore, the first period T1 is calculated, by Equation 1, to be 1,374.8 hours, which is 57.3 days when the hours are converted into days.

The second period T2 can be calculated on the basis of a dischargeable capacity C3 and a discharge current Is2 of the battery.

$$T2=C3/Is2 \qquad \text{Equation 2}$$

The dischargeable capacity C3 is a capacity which the battery 20 can discharge after the relay operates and until the battery voltage Vo reaches the usable voltage limit (e.g., 5 V). The dischargeable capacity C3 can be calculated from a correlation characteristic graph between the SOC and the cell voltage shown in FIG. 7. Note that, the graph in FIG. 7 shows the relationship between the SOC and the cell voltage when the battery is discharged at a low rate equivalent to the discharge current Is2.

The minimum drive voltage 5V of the relay 45 is converted into 1.25 V of the cell voltage, and the value of the SOC is −0.83% when the cell voltage is 1.25V. Therefore, if the relay 45 is made to operate when the SOC is 0%, the dischargeable SOC which the battery 20 can discharge until the battery voltage Vo drops to 5 V is 0.83%. When this figure is converted into the capacity (0.83×60), the dischargeable capacity C3 is calculated to be 0.5 Ah.

Figure 7:
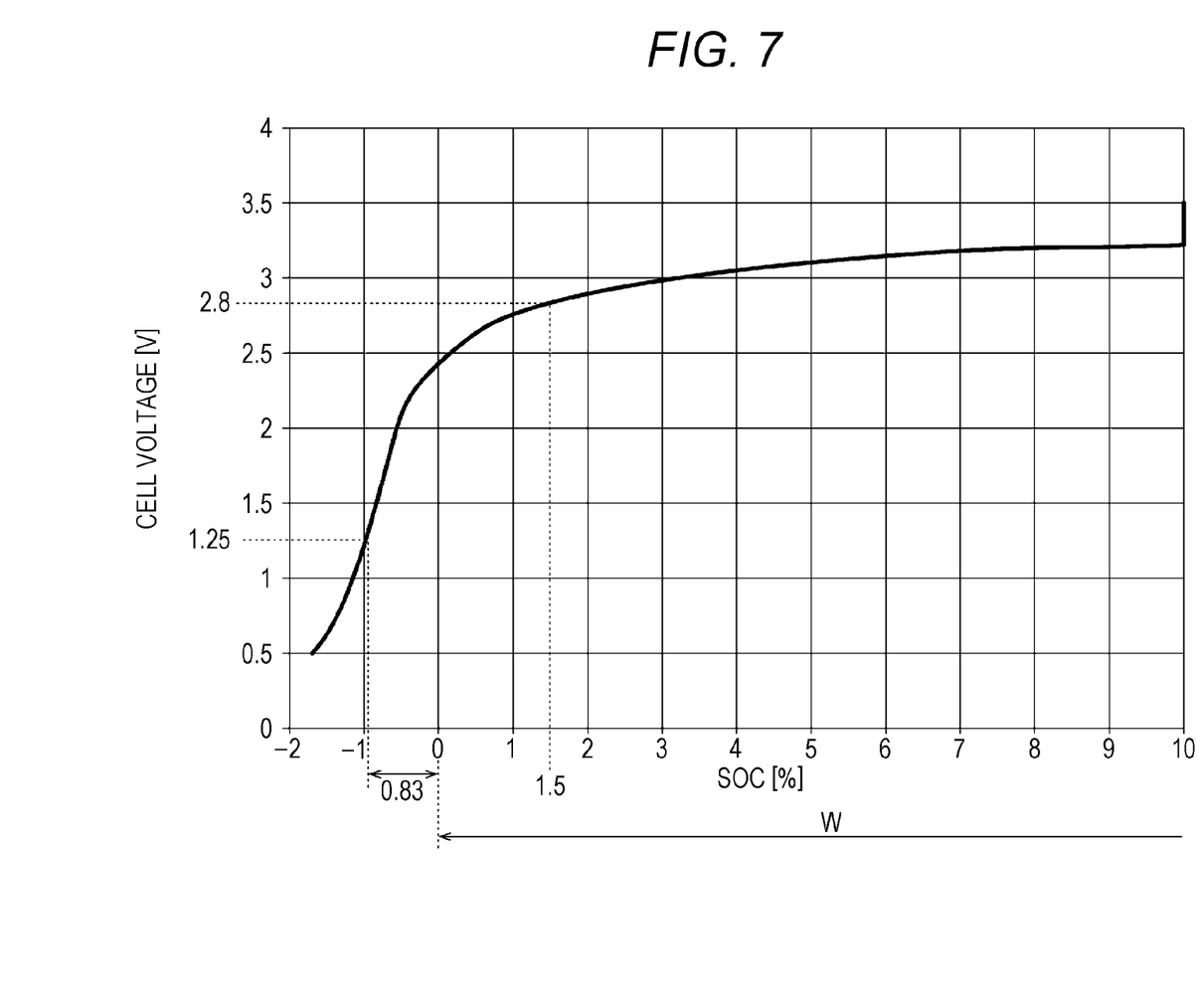
FIG. 7 is a graph showing a relationship between an SOC and a cell voltage.

Note that, as shown in FIG. 7, the SOC corresponding to a cell voltage 1.25 V is "−0.83", which is a negative figure. The reason is as follows. In the present example, 0% in the SOC is defined as the case that the battery is discharged down to 2.0 V at a rate of 1 C; therefore, if discharged at a low rate equivalent to the Is2, the SOC is 0% at approximately 2.4 V as shown in FIG. 7. A normal use range W of the secondary batteries 31 is defined supposing 0% in the SOC as the lower limit. The normal use range W of the secondary batteries 31 is appropriate to be used, having a margin with respect to overcharge and overdischarge, for example. The area in which the SOC is negative means that a capacity can be taken out in addition to the capacity of the normal use range W of the secondary batteries 31. In addition, the normal use range W is made to have a margin, considering a safety factor with respect to the limit of use of the secondary batteries 31, and the usable voltage limit (1.25 V in the present example) is lower than the lower limit (2.0 V in the present example) of the normal use range W for the 1 C rate.

The discharge current Is2 of the battery 20 is a discharge current which the battery 20 discharges when the relay 45 is opened while the vehicle is being parked. The discharge current Is2 can be obtained as a sum of the consumption current Io of the management device 50 and a self-discharge amount Ic of the battery.

In the examples of FIG. 6, the consumption current of the management device 50 is 0.25 mA, and the self-discharge amount of the battery is 0.3 mA. Thus, the discharge current Is2 is 0.55 mA. Therefore, if the relay 45 is made to operate when the SOC is 0%, the second period T2 is calculated, by Equation 2, to be 909.1 hours, which is 37.9 days when the hours are converted into days.

Therefore, if the relay 45 is made to operate when the SOC is 0%, a total period T which is a total of the first period T1 and the second period T2 is 95.2 days.

$$T=T1+T2 \quad \text{Equation 3}$$

Figure 8:
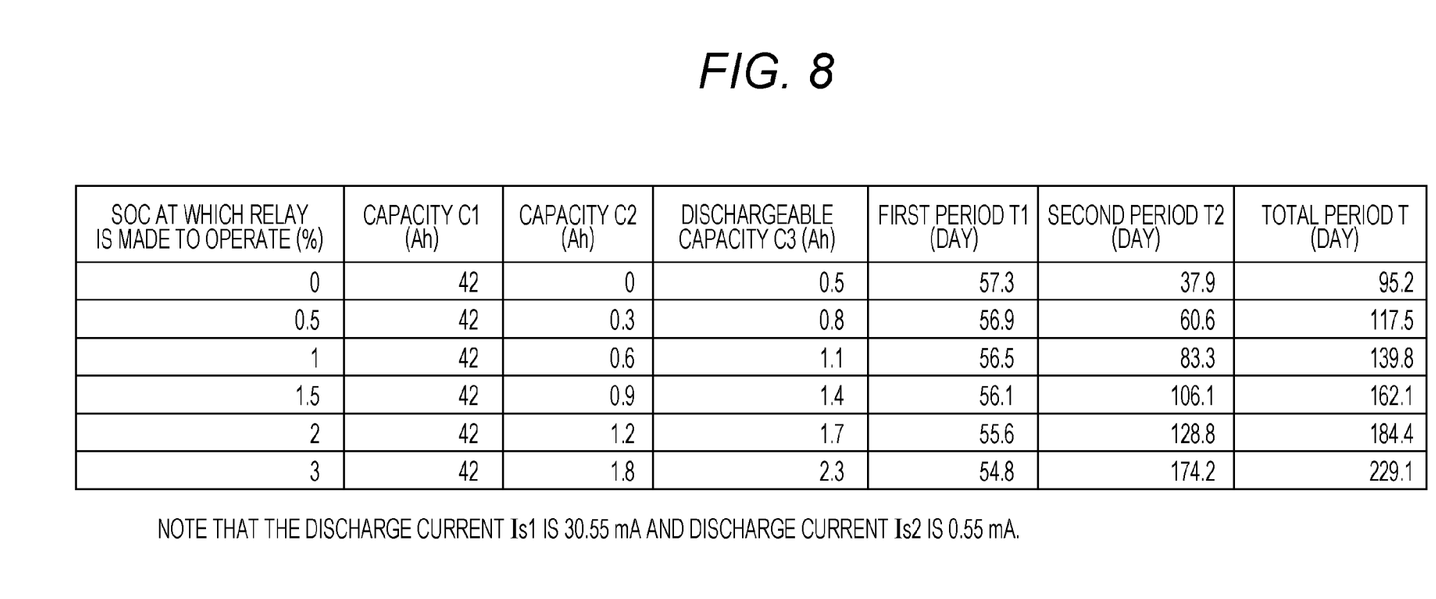
FIG. 8 is a table in which calculation results of the first period, the second period, and the total period are put together.

As described above, when the value of the SOC at which the relay 45 is made to operate is determined, it is possible to calculate each of the first period T1, the second period T2, and the total period T. FIG. 8 shows the calculation results of each of the first period T1, the second period T2, and the total period T for different SOC values of 0.5%, 1%, 1.5%, 2%, and 3% at which the relay 45 is made to operate.

Figure 9:
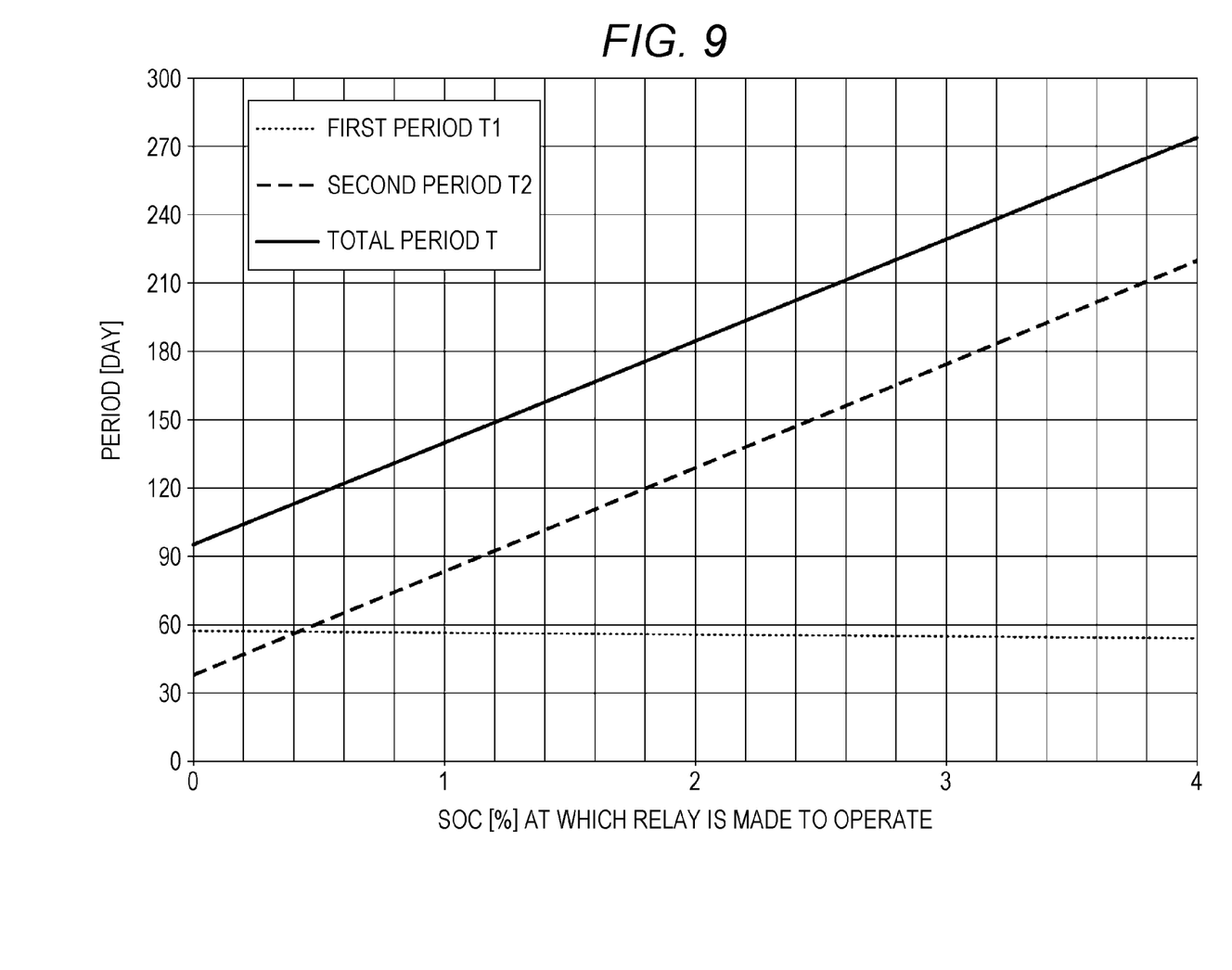
FIG. 9 is a graph showing a relationship between the value of an SOC at which a relay is made to operate and each of the first period, the second period, and the total period.

FIG. 9 is a graph in which the horizontal axis represents the values of the SOC when the relay operates and the vertical axis represents the periods T1, T2, and T. In the graph, the second period T2 and the total period T become longer approximately in proportion to the value of the SOC when the relay operates.

Even after the relay operates, the battery 20 can be usable again by driving the relay 45 (energizing the drive coil for resetting 45*d* to close the contact point 45*a*) again unless the battery voltage Vo becomes lower than the usable voltage limit.

Therefore, in the present embodiment, the threshold Xb for the relay 45 while the vehicle is being parked is so determined that the total period T, which is the total of the first period T1 and the second period T2, can be longer than a predetermined period (e.g., 150 days).

Specifically, as shown in FIG. 8 and FIG. 9, when the relay 45 is made to operate at the SOC of 1.5% or greater, the total period T is equal to or longer than 150 days. When the value 1.5% of SOC is converted into a cell voltage, the cell voltage is 2.8 V, and this voltage corresponds to the battery voltage Vo of 11.2 V. Therefore, when the threshold Xb for the relay 45 while the vehicle is being parked is set to 11.2 V or higher, the total period T is secured to be 150 days or longer.

If the relay 45 is made to operate to cut the dark current to the vehicle simultaneously when parking is started, the total period T is prolonged (longest). However, if the relay 45 is once made to operate and the contact point 45*a* is kept open, a special treatment is then necessary to drive again the relay 45 to close the contact point 45*a*. For example, a charger or the like is usually used to recharge the battery 20. This is because the management device 50 performs control such that the drive coil for resetting 45*d* is energized to close the contact point 45*a* on the basis of a condition that the connection of the charger to the external terminals 22P and 22N is detected.

During a predetermined period after start of parking, it is preferable that the battery 20 can be used without performing such a special treatment. Therefore, in the present embodiment, the threshold Xb for the relay 45 while the vehicle is being parked is set to 11.2 V so that the total period T is secured to be 150 days or longer and so that the first period T1 (the period in which the battery can be used without performing a special treatment) is prolonged (longest).

Further, in the present embodiment, the threshold Xb for the relay 45 while the vehicle is being parked is previously calculated for respective SOCs at the time of start of parking, and the SOCs at the time of start of parking and the threshold Xb for the relay 45 while the vehicle is being parked are associated with each other in a data table (FIG. 10), which is stored in the memory 73.

Figure 10:
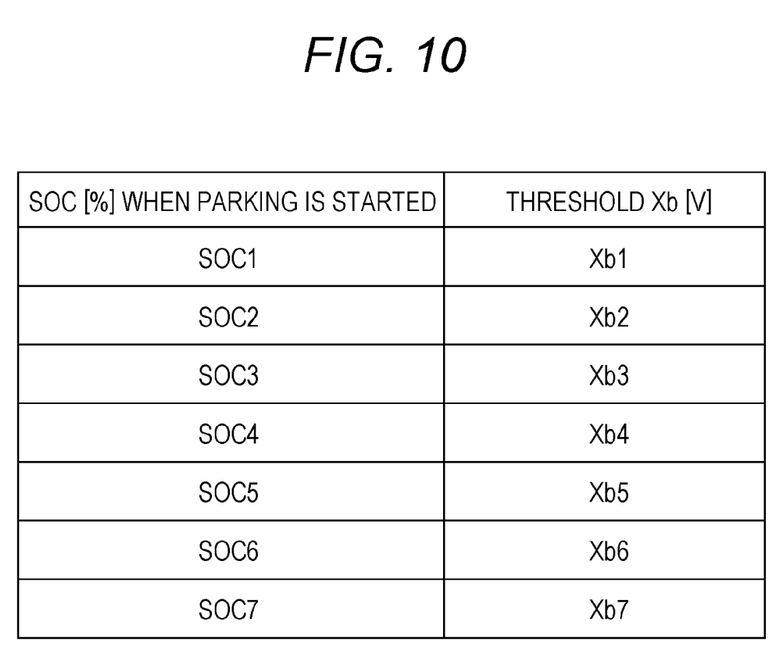
FIG. 10 is a data table of an SOC at a time of start of parking and a threshold Xb.

Upon detecting when the vehicle 1 starts being parked, the management device 50 accesses the data table stored in the memory 73 to choose the threshold Xb corresponding to the SOC at the time of start of parking.

4. A Switching Process of the Threshold X by the Management Device

After being started up, the management device 50 performs a process for monitoring the state of the battery 20. Specifically, the management device 50 monitors the current Io, the voltage Vo, and the temperature of the battery, respectively, from the outputs of the current detection resistor 41, the voltage detector 61, and the temperature sensor 43, and integrates the current Io to calculate the SOC of the battery 20.

Figure 11:
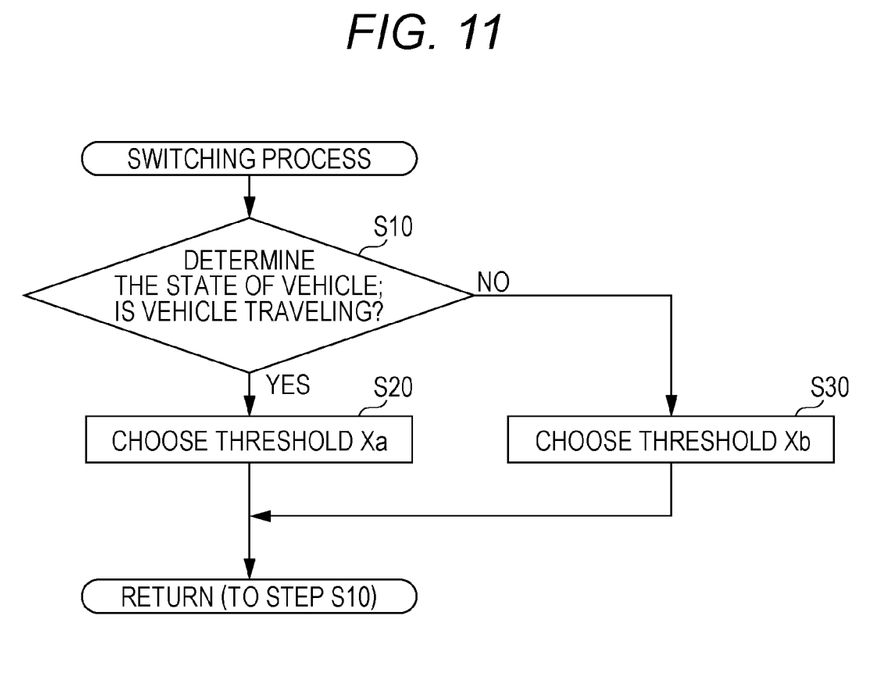
FIG. 11 is a flowchart showing the flow of a switching process of a threshold.

Further, the management device 50 performs a switching process shown in FIG. 11 in parallel with the monitoring of the battery 20. The switching process is constituted by the three steps from steps S10 to S30; and in step S10, a process for determining the state of the vehicle is performed by the management device 50. In the present example, it is determined from the current of the battery 20 whether the vehicle is in the state of traveling or in the state of being parked. Specifically, if the current Io detected by the current detection resistor 41 is greater than a prescribed vale (e.g., 1 A), the vehicle is determined to be in the traveling state. On the other hand, if the current Io is smaller than the prescribed value for a predetermined period, the vehicle is determined to be in the parking state. Note that the parking state is a state in which at least a drive unit such as an engine or a motor is stopped and in which the vehicle does not move for a predetermined period.

Alternatively, the state of the vehicle can be determined from the state of operation of the drive unit such as an engine or a motor or from a frequency of communication between the vehicle and the battery. That is, in the case that the vehicle 1 can communicate with the battery 20 about the information on the state of operation of the drive unit such as an engine or a motor, the vehicle 1 is determined to be in the traveling state when the drive unit such as an engine or a motor is operating, and the vehicle 1 is determined to be in the parking state when the drive unit such as an engine or a motor stops operating for a predetermined period. Further, the frequency of communication between the vehicle and the battery is higher while the vehicle is traveling than while the vehicle is being parked. Therefore, the determination can be made from the frequency of communication.

Then, if the management device 50 determines that the vehicle 1 is in the traveling state, the management device 50 sets the threshold, at which the relay 45 is made to operate, to the value Xa (step S20). On the other hand, if the management device 50 determines that the vehicle 1 is in the parking state, the management device 50 sets the threshold, at which the relay 45 is made to operate, to the value Xb (step S30).

The switching process of the threshold X (FIG. 11) is repeatedly performed while the management device 50 is monitoring the battery 20. Therefore, when the state of the vehicle changes, the threshold X is accordingly changed.

Then, the management device 50 compares the battery voltage Vo with the threshold Xa while the vehicle is traveling, and if the battery voltage Vo becomes lower than the threshold Xa, the management device 50 makes the relay 45 operate to cut off the current flowing through the battery 20. In addition, the management device 50 compares the battery voltage Vo with the threshold Xb while the vehicle is being parked, and if the battery voltage Vo becomes lower than the threshold Xb, the management device 50 makes the relay 45 operate to cut off the current flowing through the battery 20.

5. The Description of Effects

Regarding the battery 20, the threshold Xa at which the relay 45 is made to operate while the vehicle is traveling and the threshold Xb at which the relay 45 is made to operate while the vehicle is being parked have different values. Therefore, it is possible to achieve the battery performance which is appropriate for each of the state in which the vehicle is traveling and the state in which the vehicle is being parked. Specifically, the threshold Xa while the vehicle is traveling is lower in voltage than the threshold Xb while the vehicle is being parked; therefore, the supply of power to the vehicle can be maintained to a lower battery voltage Vo while the vehicle is traveling than while the vehicle is being parked. In addition, it is possible to prevent or reduce drop of the capacity of the battery 20 by making the relay 45 operate at a higher voltage while the vehicle is being parked than while the vehicle is traveling to cut off the vehicle dark current.

Other Embodiments

The present invention is not limited to the embodiment described in the above description and the drawings, and, for example, the following embodiments are also included in the technical scope of the present invention.

(1) In the present embodiment, as an example of the energy storage device, the lithium ion secondary battery 31 is exemplified; however, other secondary batteries such as a nickel-metal hydride secondary battery may be used. Further, a capacitor or other devices may be used. In the present embodiment, as an example of the battery, a multi-cell configuration is exemplified; however, a single-cell configuration may be used.

(2) In the present embodiment, as an example of the cut-off device, the relay 45 is exemplified; however, a semiconductor switch such as an FET or a transistor may be used. In addition, as the relay, a latching type relay is exemplified; however, a relay without latching function may be used.

(3) In the present embodiment, the thresholds Xa and Xb are defined by the battery voltage Vo at which the relay 45 is cut off; however, the cell voltage of the secondary batteries 31 may be used to define. For example, the following method may be used. The threshold Xa while the vehicle is being parked is set to be 2.8 V of the cell voltage, and the threshold Xb while the vehicle is traveling is set to be 1.25 V of the cell voltage. While the vehicle is being parked, the minimum cell voltage is compared with the threshold Xa to determine whether the relay 45 is operable or not, and while the vehicle is traveling, the minimum cell voltage is compared with the threshold Xb to determine whether the relay 45 is operable or not. Alternatively, the thresholds Xa and Xb may be defined by the residual capacity or the SOC of the battery other than the battery voltage and the cell voltage.

(4) In the present embodiment, the magnitude relationship between the threshold Xa for the relay 45 while the vehicle is traveling and the threshold Xb for the relay 45 while the vehicle is being parked is Xa<Xb; however, the relationship may be defined as Xa>Xb.

(5) In the present embodiment, an example is described in which the threshold Xb at which the relay is made to operate is set such that the total period T, which is a total of the first period T1 and the second period T2, is 150 days or longer. However, the figure of 150 days is an example, and other number of days such as 200 days may be used.

(6) In the present embodiment, a configuration is exemplified in which the data table shown in FIG. 10 is previously stored in the memory; however, when parking of the vehicle is started, the threshold Xb may be calculated by the calculation method exemplified in the first embodiment from the residual capacity of the battery at the time of start of the parking, the discharge currents Is1 and Is2 of the battery, and the data of the minimum drive voltage of the relay so that the total period T and the first period T1 will be desired numbers of days.

The invention claimed is:

1. An energy storage apparatus for a vehicle, the energy storage apparatus comprising:
   an energy storage device;
   a voltage detector configured to detect a voltage of the energy storage device;
   a controller configured to calculate a capacity of the energy storage device; and
   a cut-off device which cuts off a current to/from the energy storage device when the voltage or the capacity of the energy storage device is lower than a threshold, wherein:
   the threshold for the cut-off device is different between a state in which the vehicle is traveling and a state in which the vehicle is being parked; and the threshold for the cut-off device is lower while the vehicle is travelling than while the vehicle is parked.

2. The energy storage apparatus for a vehicle according to claim 1, wherein:
the cut-off device is driven by a power supplied from the energy storage device, and
the threshold for the cut-off device while the vehicle is traveling is a minimum drive voltage of the cut-off device.

3. The energy storage apparatus for a vehicle according to claim 1, wherein:
the cut-off device is driven by a power from the energy storage device, and
the threshold for the cut-off device while the vehicle is being parked is a voltage higher than a minimum drive voltage of the cut-off device.

4. The energy storage apparatus for a vehicle according to claim 3, wherein:
the threshold for the cut-off device while the vehicle is being parked is set, via the controller, such that a total period which is a total of a first period and a second period is equal to or longer than a predetermined period,
the first period is a period from when parking is started until the cut-off device performs a cut-off operation, and
the second period is a period which is after the cut-off device performs the cut-off operation and in which the energy storage device becomes usable again when the cut-off device is drove again.

5. The energy storage apparatus for a vehicle according to claim 4, wherein the threshold for the cut-off device while the vehicle is being parked is set, via the controller, such that the total period is equal to or longer than the predetermined period and such that the first period is longest.

6. A vehicle comprising the energy storage apparatus according to claim 1.

7. The energy storage apparatus for a vehicle according to claim 1, wherein:
the controller is configured to store data of thresholds in the state in which the vehicle is traveling and the state in which the vehicle is parked; and
the controller is configured to compare the voltage of the energy storage device with the threshold while the vehicle is traveling.

8. An energy storage apparatus for a vehicle, the energy storage apparatus comprising:
an energy storage device; and
a cut-off device which cuts off a current to/from the energy storage device when a voltage or a capacity of the energy storage device is lower than a threshold,
wherein:
the threshold for the cut-off device is different between a state in which the vehicle is traveling and a state in which the vehicle is being parked,
the cut-off device is driven by power from the energy storage device, and
the threshold for the cut-off device while the vehicle is being parked is a voltage higher than a minimum drive voltage of the cut-off device.

9. The energy storage apparatus for a vehicle according to claim 8, wherein:
the threshold for the cut-off device while the vehicle is being parked is set, via a controller, such that a total period which is a total of a first period and a second period is equal to or longer than a predetermined period,
the first period is a period from when parking is started until the cut-off device performs a cut-off operation, and
the second period is a period which is after the cut-off device performs the cut-off operation and in which the energy storage device becomes usable again when the cut-off device is drove again.

10. The energy storage apparatus for a vehicle according to claim 9, wherein the threshold for the cut-off device while the vehicle is being parked is set, via the controller, such that the total period is equal to or longer than the predetermined period and such that the first period is longest.

11. The energy storage apparatus for a vehicle according to claim 8, wherein the threshold for the cut-off device is lower while the vehicle is travelling than while the vehicle is parked.

12. A vehicle comprising the energy storage apparatus according to claim 8.

* * * * *